US005121038A

United States Patent [19]

Yamamura et al.

[11] Patent Number: 5,121,038

[45] Date of Patent: Jun. 9, 1992

[54] WINDOW REGULATING APPARATUS

[75] Inventors: Kengo Yamamura, Shizuoka; Noboru Handa, Kosai, both of Japan

[73] Assignee: Asmo Co., Ltd., Shizuoka, Japan

[21] Appl. No.: 568,893

[22] Filed: Aug. 17, 1990

[30] Foreign Application Priority Data

Aug. 23, 1989 [JP] Japan ................................ 1-216975

[51] Int. Cl.$^5$ ................................................ H02P 1/22

[52] U.S. Cl. .................................... 318/280; 318/256; 318/293

[58] Field of Search ............... 318/256, 264, 265, 266, 318/267, 280, 281, 282, 283, 284, 286, 293, 294, 466, 467, 468, 469

[56] References Cited

U.S. PATENT DOCUMENTS

| | | | |
|---|---|---|---|
| 3,305,718 | 2/1967 | Waldron | 318/261 |
| 3,629,606 | 12/1971 | Mathey | 307/114 |
| 3,675,101 | 7/1972 | Robbins | 318/266 |
| 3,815,005 | 6/1974 | Berger | 318/466 |
| 4,335,340 | 6/1982 | Hara et al. | 318/282 |
| 4,471,275 | 9/1984 | Comeau | 318/286 |
| 4,629,953 | 12/1986 | Inoue et al. | 318/468 |
| 4,857,813 | 8/1989 | Matsumoto et al. | 318/54 |
| 4,864,153 | 9/1989 | McIntosh, Jr. | 318/282 X |
| 4,896,084 | 1/1990 | Maue et al. | 318/280 |
| 4,972,129 | 11/1990 | Kawai et al. | 318/285 |

*Primary Examiner*—Bentsu Ro

*Attorney, Agent, or Firm*—Venable, Baetjer and Howard

[57] ABSTRACT

A vehicle window regulating apparatus is designed to move a window glass in a door on the side of a passenger seat up and down by operations of a remote contol switch installed on the door on the side of a driver seat. A relay is provided on a power supply line for supplying electric power to a motor in the door on the passenger seat side. This relay and the remote control switch are connected by way of a signal line and is of a diameter smaller than that of the power supply line. With operations on the remote control switch, switching signals are supplied to the relay via the signal line, and the relay is thereby turned on and off so as to supply electric power to the motor via the power supply line, so that the window glass is moved upward or downward. In the prior art apparatus, the motor on the passenger seat side is remote-controlled via the power supply line, but the present invention performs the remote control of the motor on the passenger seat side and can therefore achieve a reduction of power supply loss.

18 Claims, 8 Drawing Sheets

WINDOW REGULATING APPARATUS

BACKGROUND OF THE INVENTION

1. Field of the Invention

The present invention relates to a regulating apparatus for effecting the up-down movement of a window glass and more particularly to a window regulating apparatus which is provided in the door on a driver's side with a master switch capable of regulating the up-down movement of not only a window glass positioned on the side of a drivers seat but also a window glass positioned on the other side.

2. Description of the Related Art

FIG. 8 and FIG. 9 show circuit diagram for a conventional window regulating apparatus.

This window regulating apparatus is constituted such that a motor 22 installed in a door 12 on the side of a driver seat, for moving a window glass 16 up and down, and a motor 23 installed in a door 14 on the side of a passenger seat, for moving a window glass 18 up and down, are selectively connected to a power source 26 (a battery unit mounted on a vehicle) or disconnected therefrom by operation of a master switch 24 installed on the door 12 on the driver's side. The master switch 24 is provided with an up-down switch 28, which is used to operate the motor 22 installed in the door 12 on the driver seat, and an up-down switch 32, which is used to operate the motor 23 installed in the door 14 on the passenger seat. On the other hand, an up-down switch 34 for operating the motor 23 is installed in the door 14 on the side of the passenger seat.

A wiring cable 36 connected to the power source 26 is led to be connected to one stationary contact of the up-down switch 28 and one stationary contact having a pair of contact points 32A and 32B in the up-down switch 32. moreover, this wiring 36 is connected to one stationary contact having a pair of contact points 34A and 34B in the up-down switch 34 by way of a wiring cable 38 which is laid across the vehicle in its transverse direction. Moving contacts 32C and 32D in the up-down switch 32 are connected to the other stationary contact having a pair of contact points 34C and 34D in the up-down switch 34 by way of wiring cable 42 and 44 crossing the vehicle in its transverse direction.

With this construction, the window glass 18 in the door 14 is moved up and down by the operation of the motor 23 either when the up-down switch 32 in the master switch 24 is operated or when the up-down switch 34 on the door 14 on the side of the passenger seat is operated.

However, in a conventional regulating apparatus like the one just described, the wiring cables 36, 38, 42, and 44 should respectively have a large diameters, namely, enough capacity for supplying electric power to the motor 22 and the motor 23. Moreover, as the wiring cables are grounded only in the door 12 on the driver seat, it is necessary to dispose the three wiring cables 38, 42, and 44 between the doors 12 and 14. In particular, these wiring cables 38, 42 and 44 have a considerable length since they are laid over a wide range crossing the vehicle in its transverse direction. Therefore, the total resistance in the power supplying line grows so large that the power loss is considerably large.

SUMMARY OF THE INVENTION

In view of the above, an object of the present invention is to provide a window regulating apparatus which eliminates the necessity for many thick diameter power cables to be laid across the vehicle and also attains minimum power loss due to the wiring resistance.

In order to accomplish the object described above, the present invention comprises passenger seat side driving means installed in the door on the passenger seat, for moving a window glass in the door on the passenger seat side up and down, a power supply line on the passenger side for supplying electric power to the passenger seat side driving means on the passenger seat side, remote control means provided in the door on a driver seat side and designed to supply electric power to the passenger seat side driving means on the passenger seat side and to generate a first switching signal for cutting off the electric power supplied to the passenger seat side driving means, a switching means for supplying electric power to the passenger seat side driving means via said power supply line on the passenger seat side and for cutting off electric power being supplied to the passenger seat side driving means, and a signal line which connects the remote control means and the switching means in such a manner that the first switching signal generated from the remote control means is transmitted to the switching means.

The remote control means generates the first switching signal for supplying electric power to the passenger seat side driving means on the passenger seat side and for cutting off electric power being supplied to the passengers seat side driving means. This switching signal is supplied to the switching means via a signal line. In response to the first switching signal, the switching means performs its switching operations for supplying electric power to the driving means on the passenger seat side via the power supply line on the passenger seat side and for cutting off electric power being supplied the said driving means. Now that the signal line needs to have a diameter sufficient for the transmission of the switching signals, the line can be smaller in diameter than that of the power supply line. To the driving means on the passenger seat side, electric power is supplied directly from the power source via the power supply line on the passenger seat side, namely, not by way of the remote control means provided in the door on the driver seat side. Therefore, the present invention is capable of producing the effect that it achieves a reduction in power supply loss through a reduction of wiring resistance by simplifying the wiring between the door on the driver seat side and the door on the passenger seat side.

BRIEF DESCRIPTION OF THE DRAWINGS

The manner by which the above object and other objects, features and advantages of the present invention are attained will be fully evident from the following detailed description when it is considered in light of the drawings, wherein.

DETAILED DESCRIPTION OF THE INVENTION

Reference will now be made in detail to the construction according to the present invention as illustrated in the accompanying drawings, in which like reference numbers designate like or corresponding parts throughout the several drawings.

In the description to follow, some embodiment of the present invention will be used as examples. It should be understood, however, that the present invention is not limited to these examples of its embodiment, but may be applied effectively to other forms of its embodiment to such an extent as will not deviate from the technical scope defined for the present invention.

Figure 1:
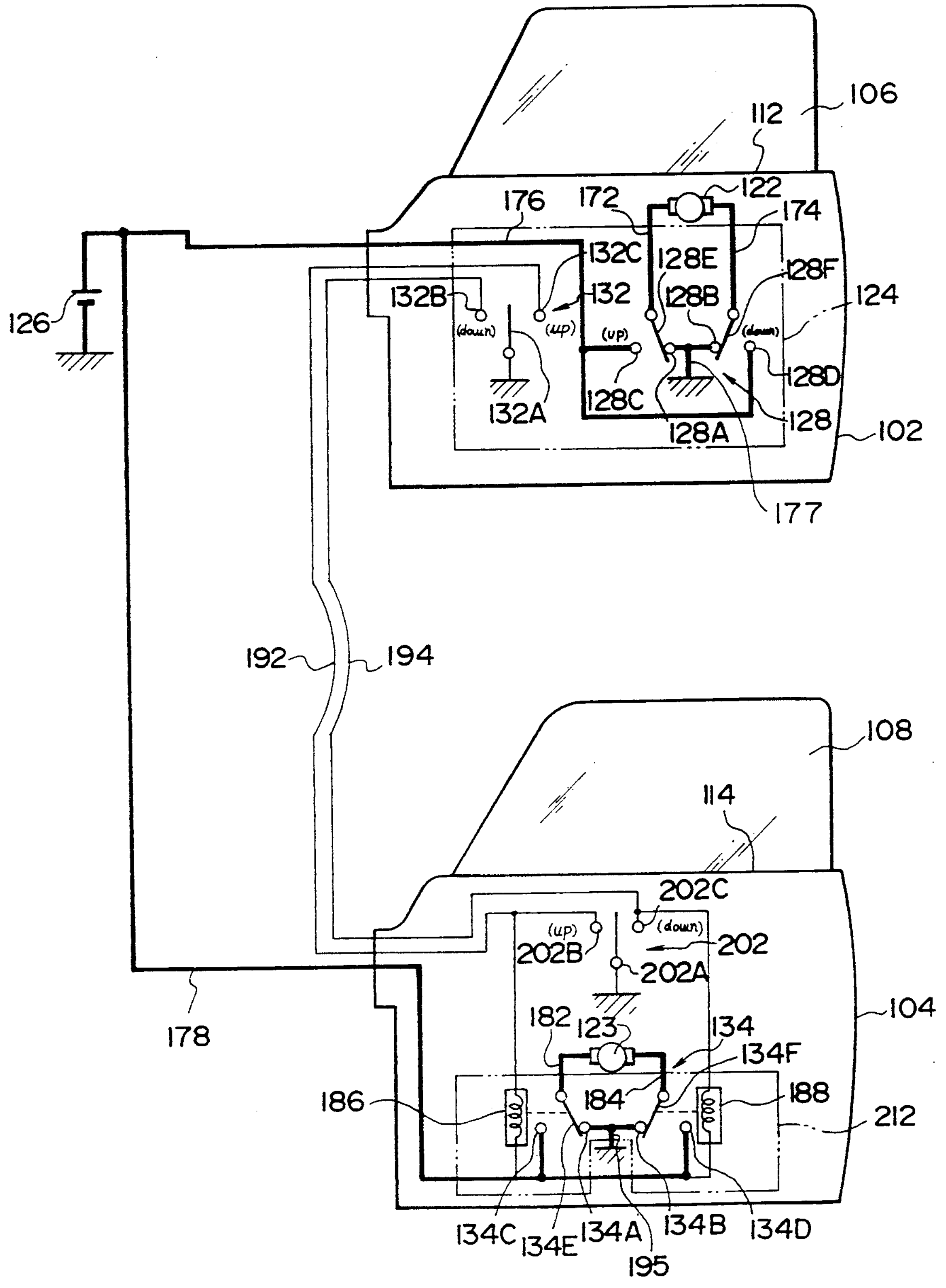
FIG. 1 is a circuit diagram for a door window glass control apparatus in accordance with the present invention.
Figure 2:
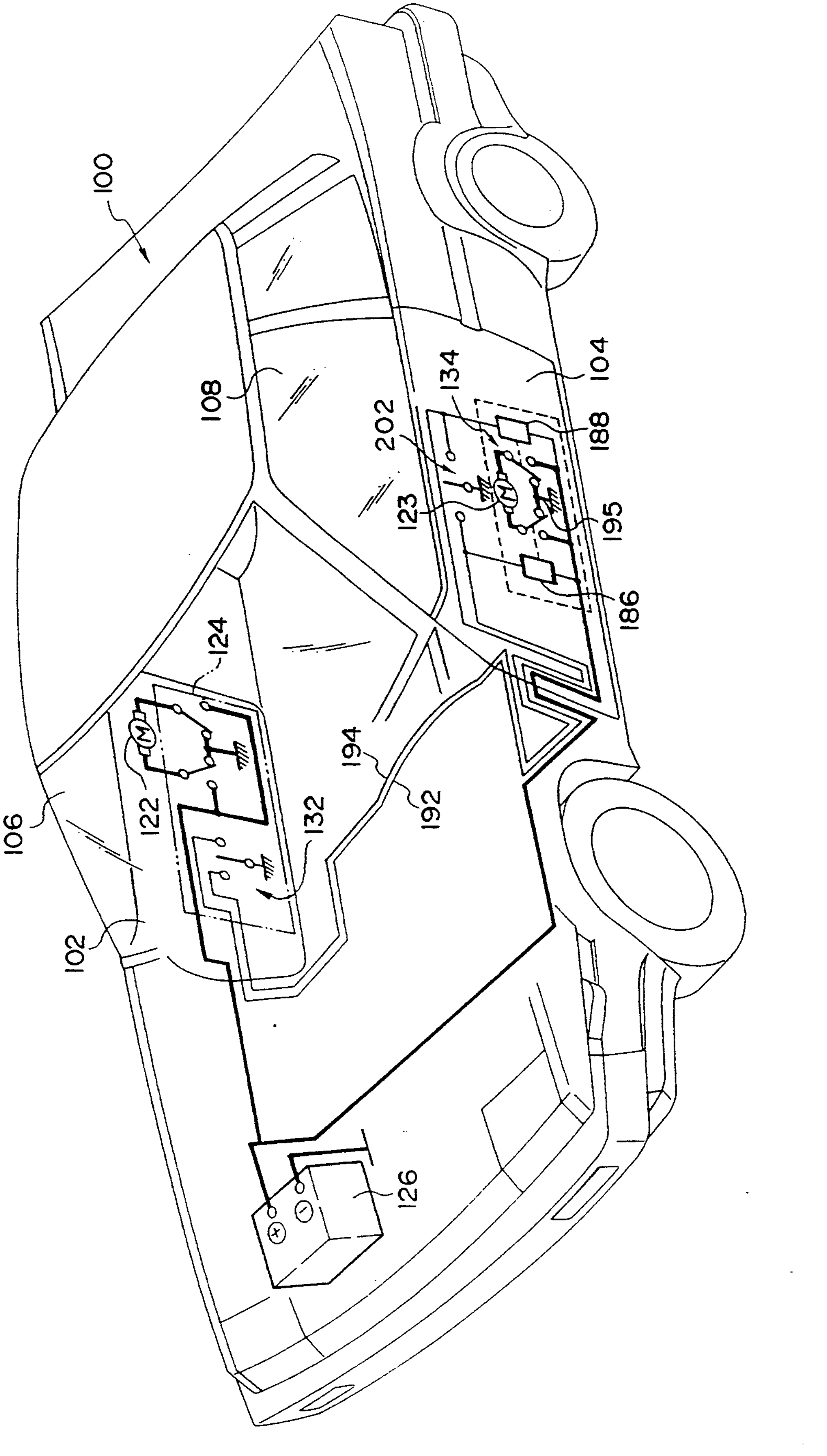
FIG. 2 is a perspective view illustrating the state of wiring as applied to a motor vehicle body.

FIG. 1 and FIG. 2 illustrate a motor vehicle to which the present invention is applied. Door window glasses 106 and 108 are respectively set in a door 102 on a driver seat side and in a door 104 on a passenger seat side. The window glass 106, 108 are designed to be respectively moved up and down by means of motors 122 and 123 installed in the respective doors 102 and 104.

The door 102 on the driver seat side is provided with a master switch 124, which connects the motors 122 and 123 to a power source 126 mounted on the vehicle and also cut off the motors 122 and 123 from the power source 126, thereby controlling the driving and stopping of the motors 122 and 123.

The master switch 124 is provided with an up-down switch 128 for controlling the motor 122 and another up-down switch 132 for controlling the motor 123. Another up-down switch 202 for controlling the motor 123 is installed in the door 104 on the passenger seat side.

Figure 4:
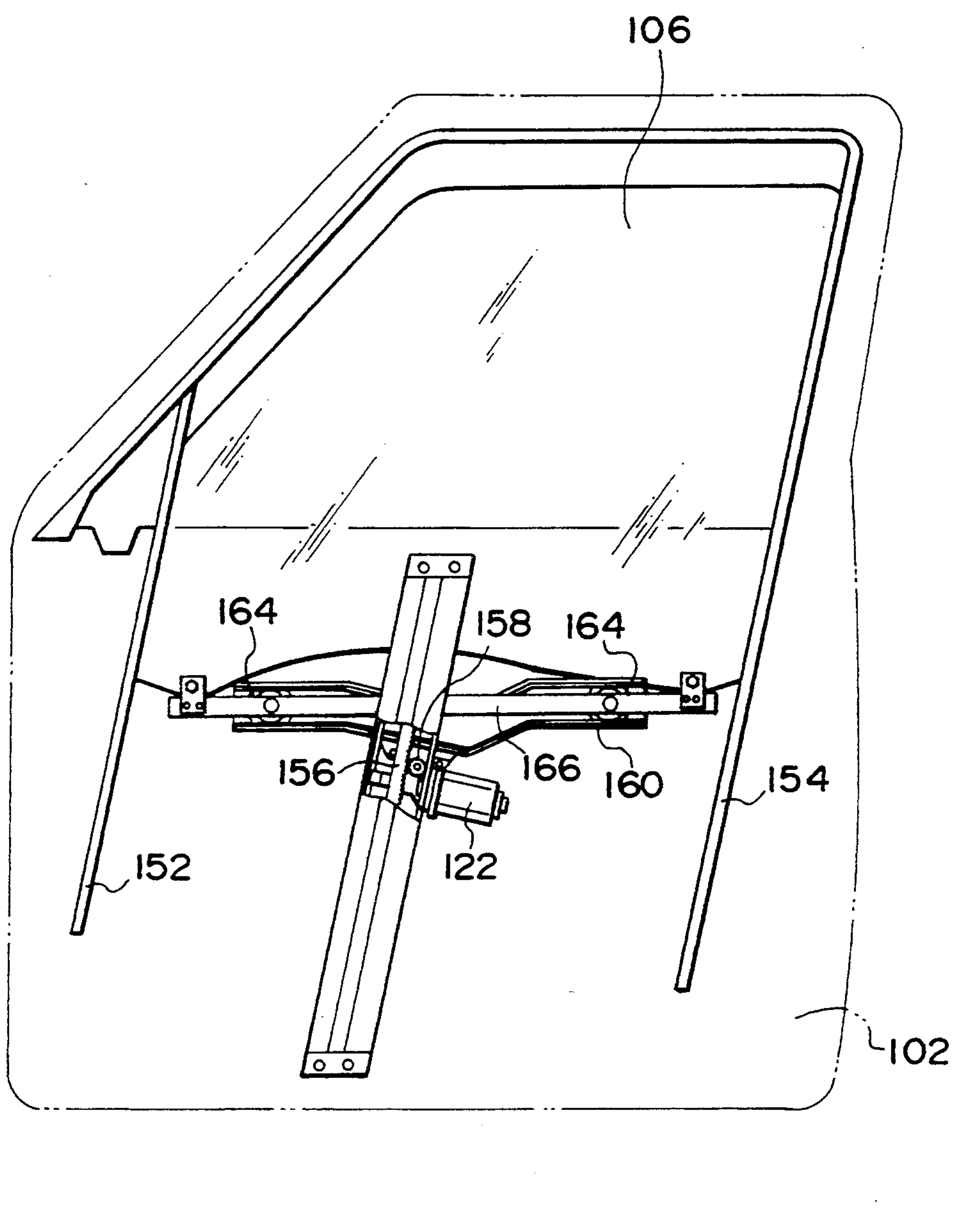
FIG. 4 is a side view illustrating the state of the guide for the window glass in the door on the driver seat side.

Since the driving mechanism for the door window glass 106 in the door 102 on the side of the driver seat and that for the door window glass 108 in the door 104 on the side of the passenger seat are identical, a description (with reference to FIG. 4) will be made of the driving mechanism in the door 102 on the driver seat side only.

The door window glass 106 is set in such a manner that it moves up and down. The side edge of the glass 106 closer to the front of the vehicle and the side edge thereof closer to the rear of the vehicle are guided by a pair of guide rails 152 and 154, which are arranged in parallel in the vertical direction inside the door 102.

The door 102 has a rack 156 with both the upper and lower ends thereof fixed to the door 102. The rack 156 is set in a meshing relationship with a pinion 158 fixed to the output shaft of the motor 122. The motor 122 is mounted to the lower end portion of the door window glass 106 via a bracket 160 and an arm extending in the horizontal direction of the vehicle. Therefore, when the motor 122 is rotated, the motor 122 itself moves in the vertical direction along the rack 156.

In this embodiment, a roller 164 is arranged in such a manner within a bracket 164 to which the motor 122 is fixed as to be rotatably movable in the forward and backward directions of the vehicle. This roller 164 is rotatably supported to an arm 166 fixed to the lower edge portion of door window glass 106. Hence, the motor 122 and the door window glass 106 can move relative to each other in the forward and backward directions of the vehicle, so that the rack 156 and the pinion will not unmesh even if there is an error in the mounting of the rack 156 and the guide rails 152 and 154.

As shown in FIG. 1, the up-down switch 128 is provided with fixed contact points 128A, 128B, 128C, and 128D. A moving contact point 128E is positioned between the fixed contact points 128A and 128C. A movable contact point 128F is positioned between the fixed contact points 128B and 128D. Moreover, the movable contact points 128E and 128F are so constructed that force-applying means applies a constant force in the direction in which they are brought into contact with the fixed contact points 128A and 128B, respectively. The movable contact points 128E and 128F therefore resume their state in contact with the fixed contact points 128A and 128B as shown in FIG. 1 when the force-applying means is released after the driver has applied the operating force of switching the movable contact points 128E and 128F move in a direction so that they come in contact with the fixed contact points 128C and 128D.

In addition, the movable contact point 128E is connected to the motor 122 by the driving power supply line 172 while the moving contact point 128F is connected to the motor 122 by the driving power supply lines 174. The fixed contact point 128C and the fixed contact point 128D are connected by the driving power supply line 176 to the power source 126 (the battery mounted on the vehicle). Moreover, the fixed contact points 128A and 128B are grounded by an earthing line 177, which is the same diameter as the wire for the driving power supply line.

This up-down switch 128 works in such a manner that, when the movable contact point 128E is brought into contact with the fixed contact point 128C, one terminal of the motor 122 is connected to the power source 126 by way of the power supply line 172, the movable contact point 128E, the fixed contact point 128c, and the power supply line 176. The other terminal of the motor 122 is grounded via the fixed contact point 128B and the earthing line 177. Therefore, the motor 122 is rotated in the direction for moving the door window glass 106 up. on the other hand, when the movable contact point 128F is brought into contact with the fixed contact point 128D, the direction of the electric current supplied to the motor 122 is reversed, so that the motor 122 is rotated in the direction for moving the door window glass 106 down.

The up-down switch 132 is provided with a movable contact point 132A, which is grounded via an earthing line that is the same diameter as the signal wiring, and a fixed contact points 132B and 132C. The movable contact point 132A is held in a neutral position by a force-applying means and consequently resumes its neutral position, as shown in FIG. 1, when the driver has applied an operating force to the movable contact point 132A in the direction for its contact with the fixed contact point 132B or the fixed contact point 132C and then releases the operating force.

A relay means 134 is installed in the door 104 on the passenger seat side of the vehicle. This relay means 134 is provided with fixed contact points 134A and 134B, both of which are connected to the ground by an earthing line 195 which is the same diameter as the power supply line. It is also provided with fixed contact points 134C and 134D, which are connected respectively to the power source 126 via a driving power supply line 178. The movable contact point 134E is arranged between the fixed contact point 134A and the fixed contact point 134C while the movable contact point 134F is arranged between the fixed contact point 134B and the fixed contact point 134D. The movable contact point 134E is connected to one terminal of the motor 123 by a driving power supply line 182 while the movable contact point 134F is connected to the other terminal of the motor 123 by a driving power supply line 184. Also a force is constantly applied by a force-applying means to the movable contact point 134E and the movable contact point 134F so that they contact the fixed contact point 134A and the fixed contact point 134B. Moreover, a relay coil 186 and a relay coil 188 are provided respectively to bring the movable contact point 134E and the movable contact point 134F into contact with the fixed contact point 134C and the fixed contact point 134D in counteraction with the force-applying means. One terminal of the relay coil 186 and one terminal of the relay coil 188 are connected respectively to the driving power supply line 178 in the door 104 on the passenger seat side while the other terminals of these relay coils are connected respectively to the fixed contact points 132B and 132C by way of the signal lines 192 and 194. These signal lines 192 and 194 are smaller in diameter than that of the driving power supply lines yet are thick enough to supply electric current needed to conduct the electric power for the signal transmission to the relay coils 186 and 188.

In addition, an up-down switch 202 for operation by the passenger is installed in the door 104 on the passenger seat side. A movable contact point 202A of the up-down switch 202 is grounded by an earthing line that is the same diameter as that of the signal line while fixed contact points 202B and 202C are connected respectively to signal lines 192 and 194 and to the relay coils 186 and 188. The movable contact point 202A is normally kept in its neutral position by a force-applying means in the same manner as in the case of the up-down switch described above, so that the movable contact point 202A assumes a neutral position when the passenger releases the operating force after applying such force to the movable contact point 202A for its contact with the fixed contact point 202B or with the fixed contact point 202C.

Therefore, when the driver brings the movable contact point 132A of the up-down switch 132 into contact with the fixed contact point 132C on the driver seat side, one terminal of the relay coil 186 is grounded by way of this up-down switch 132. Electric power is thereby conducted to the relay coil 186, and, by the force generated by magnetic excitation, the movable contact point 134E is moved and brought into contact with the fixed contact point 134C. By this, one terminal of the motor 123 is connected to the power source 126 by way of the driving power supply line 182, the movable contact point 134A, and the driving power supply line 178. The other terminal of the motor 123 is grounded via the driving power supply line 184, the movable contact point 134F, and the driving power supply line 195. Hence, the motor 123 is driven in the direction for moving the door window glass 108 upward. On the contrary, when the movable contact point 132A in the up-down switch 132 is brought into contact with the fixed contact point 132B, one terminal of the relay coil 188 is grounded via the up-down switch 132 while the other terminal of the relay coil 188 is connected to the power source 126 via the driving power supply line 178. With the force generated by magnetic excitation, the relay coil 188 moves the movable contact point 134F and brings it into contact with the fixed contact point 134A. Hence, electric current in the direction reverse to that of the current mentioned above is conducted to the motor 123, and the door window glass 108 is thereby moved downward.

When the movable contact point 202A in the up-down switch 202 on the door 104 on the passenger seat side is brought into contact with the fixed contact point 202B, the resulting state will be the same as in the case in which the movable contact point 132A in the up-down switch 132 is brought into contact with the fixed contact point 132B. And, when the movable contact point 202A is put into contact with the fixed contact point 202C, the resulting state will be the same as in the case in which the movable contact point 132A of the up-down switch 132 is put into contact with the fixed contact point 132C. Therefore, the motor will operate in the same way as described above.

Figure 3:
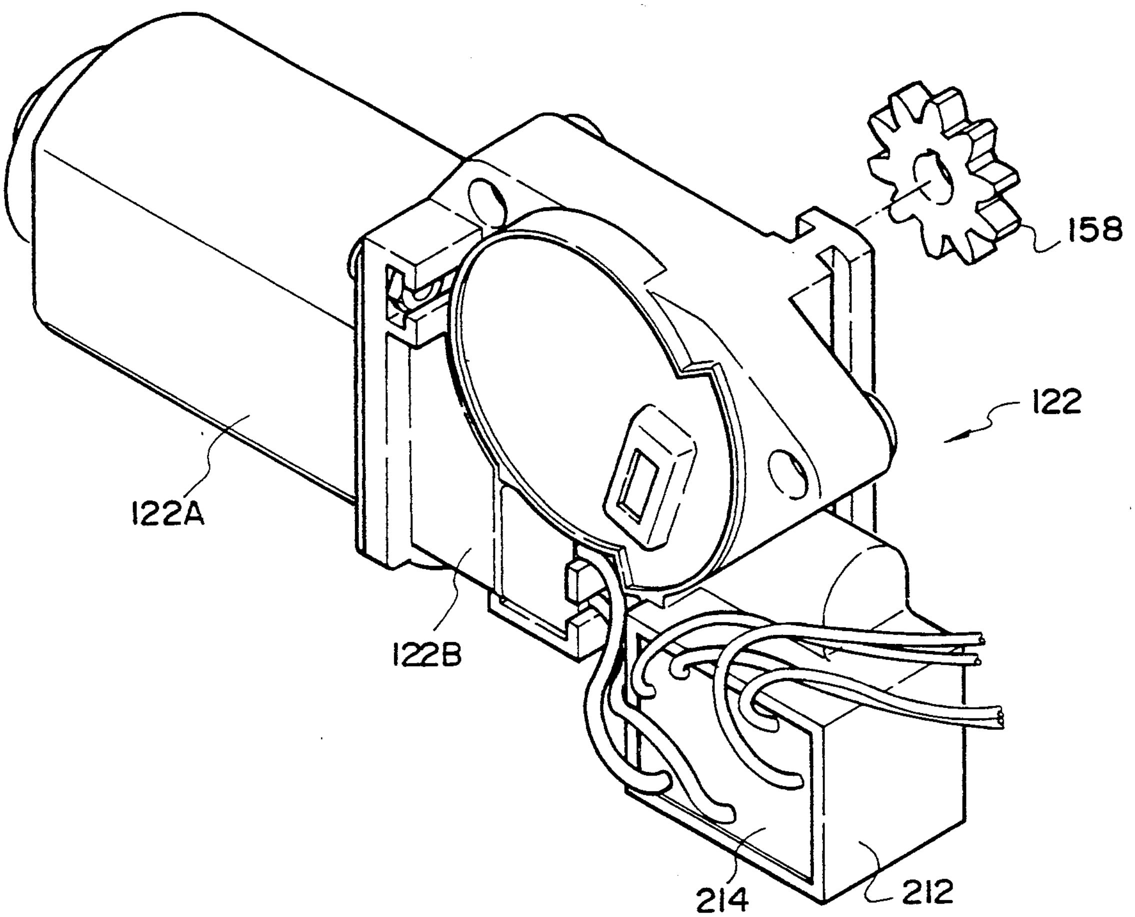
FIG. 3 is a perspective view illustrating the motor.
Figure 5:
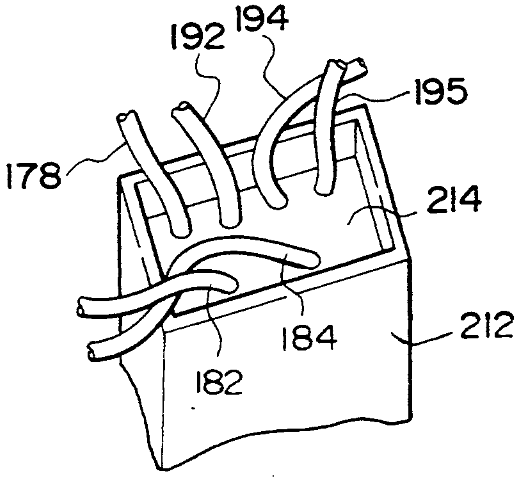
FIG. 5 is a perspective view illustrating the relay case.

FIG. 3 illustrates the construction of the component parts of the motor 122. To a main unit 122A of this motor 122 is connected a gear housing 122B, on which a pinion 158 is rotatably mounted. The relay case 212, which is fixed to a portion of the gear housing 122B, is made in the shape of a rectangular box as shown in FIG. 5. The opening of the relay case 212 is sealed with a sealing agent 214 composed of butyl rubber or the like after the relay means 134 shown in FIG. 1 is set therein. In this regard, the reference number 195 in FIG. 5 indicates an earthing line.

Thus, the relay means 134 is in the state of being housed inside the relay case 212.

Next, a description of the operation of the embodiment according to the present invention is made.

As shown in FIG. 2, the wiring of the vehicle is set up such that the master switch 124 is installed on the cabin side of the door 102 of the driver's seat and the up-down switch 202 is installed on the cabin side of the door 104 of the passenger's seat. The relay case 212 contains the relay means 134 already set therein to form a unified structure with the motor 122. It is therefore sufficient as a matter of practice to install the up-down switch 202 on and the motor 123 in the door 104 on the passenger seat side.

Figure 8:
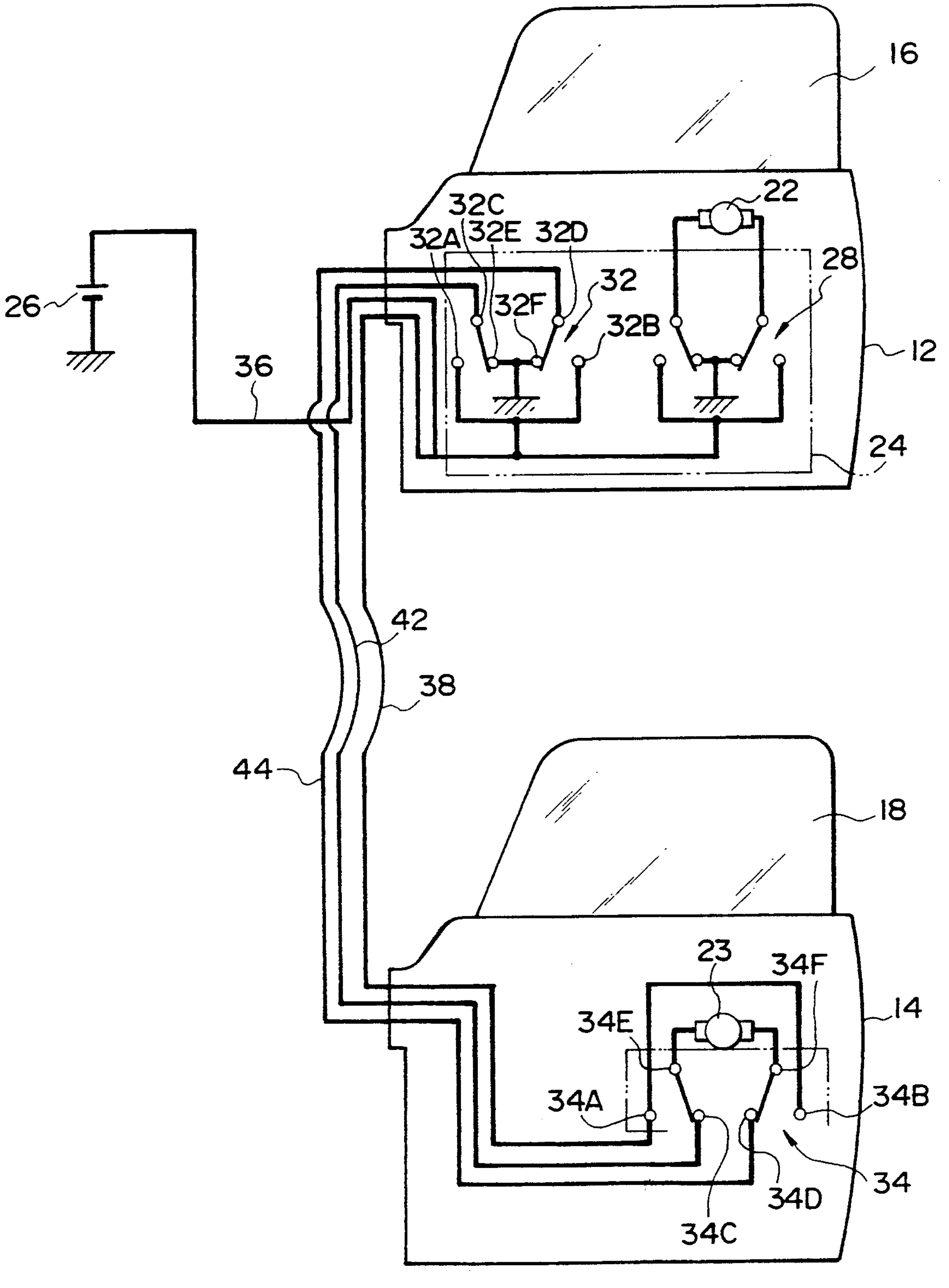
FIG. 8 (PRIOR ART)
FIG. 8 is a circuit diagram for a door window regulating apparatus according to the prior art.
Figure 9:
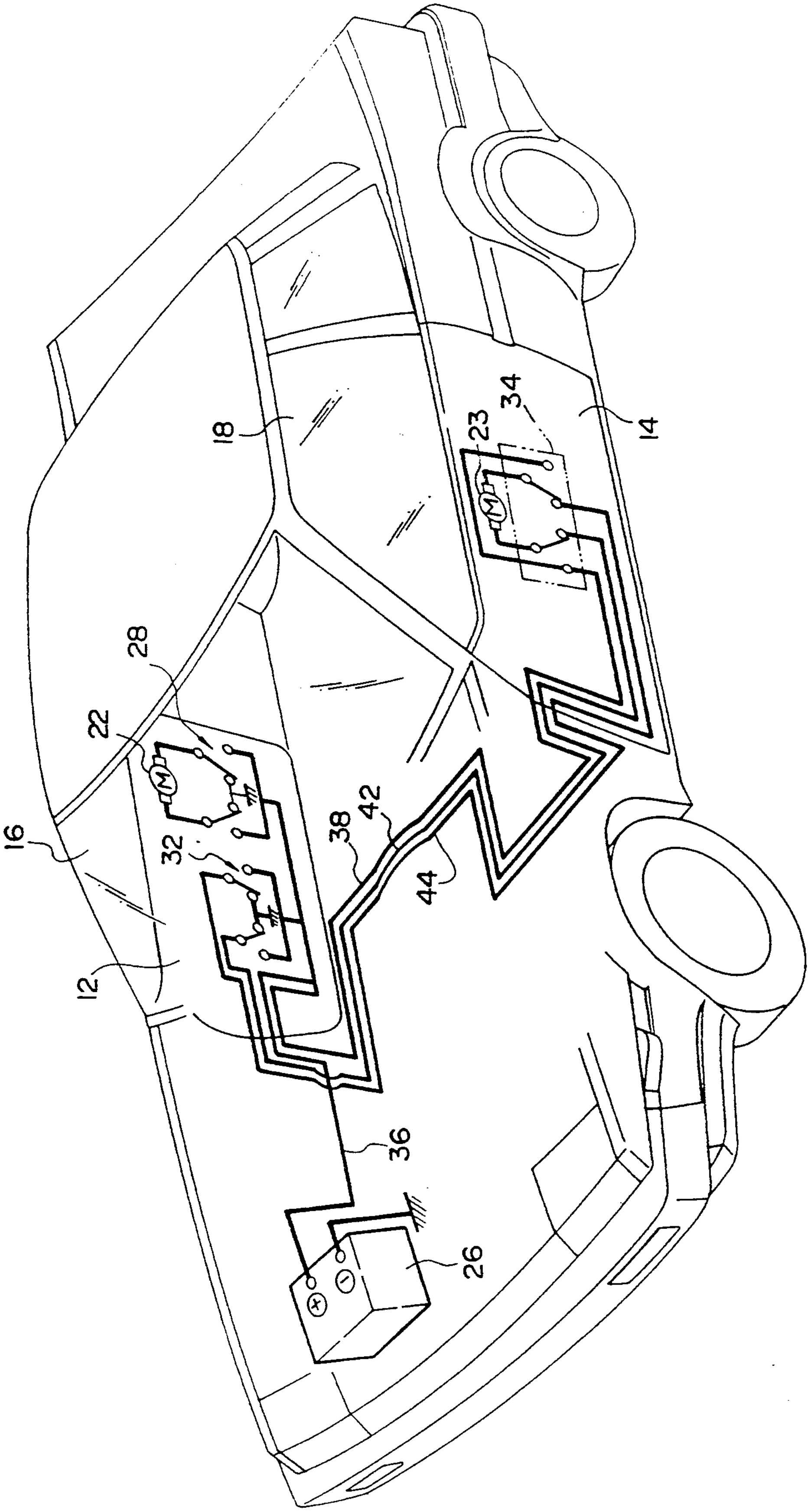
FIG. 9 (PRIOR ART)
FIG. 9 is a perspective view illustrating a door window regulating apparatus according to the prior art.

The interconnection between the door 102 on the driver seat side and the door 104 on the passenger seat side is established very easily by merely connecting them to the signal lines 192 and 194. Furthermore, it is, in many cases actual practice that a large number of switches or the like, such as control switches for locking the doors, switches for controlling the opening and closing of the doors and switches for turning on and off courtesy lamp set in the doors, are installed on the door 102 on the driver seat side, with the result that many wiring lines, in addition to those for the motor for regulating the upward and downward movement of the window glass, are led into the door from the vehicle body. Therefore, with the controlling lines for the motor for regulating the up-down movement of the window glass being simplified in this manner, the wiring construction for the entire vehicle is simplified considerably. Particularly in the case of a four-door vehicle, the total number of the wiring lines necessary for the vehicle will be nine, which is three times as many as the number of wiring lines in the prior art example shown in FIG. 8. However, in this embodiment, it is basically sufficient to use six signal cables.

For moving upward the door window glass 106 of the door 102 on the driver seat side, it is enough for the driver to operate the switch in such a manner as to bring the movable contact point 128E into contact with the fixed contact point 128C. On the contrary, when the movable contact point 128F is brought into contact with the fixed contact point 128D, the direction of the electric current flowing to the motor 122 is thereby reversed, and the door window glass 106 is moved downward.

When the driver intends to move upward the door window glass 108 in the door 104 on the passenger seat side, the driver brings the movable contact point 132A into contact with the fixed contact point 132C. By this operation, the relay coil 186 in the door 104 is excited, and the movable contact point 134E is thereby brought into contact with the fixed contact point 134C. The motor 123 is thereby rotated by which the door window glass 108 is moved upward. The upward movement of the window glass 108 takes place in the same way as when the movable contact point 202A is brought into contact with the fixed contact point 202B by the operation of the up-down switch 202.

Moreover, for moving the door window glass 108 downward, the movable contact point 132A is brought into contact with the fixed contact point 132B. This operation excites the relay coil 188, by which the movable contact point 134F is brought into contact with the fixed contact point 134D. Therefore, the direction of the electric power to the motor 123 is reversed thereby reversing the direction of rotation of the motor. Consequently the door window glass 108 is moved downward. The same downward movement of the door window glass 108 is also achieved when the movable contact point 202A in the up-down switch 202 is brought into contact with the fixed contact point 202C.

Figure 6A:
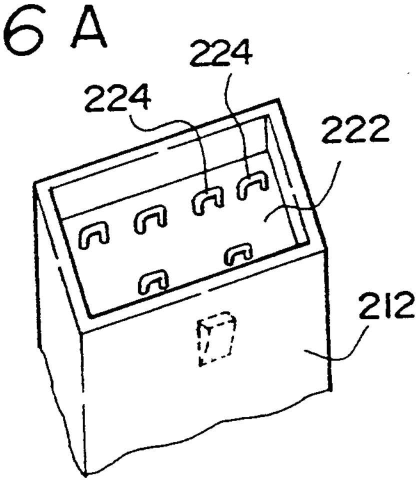
FIG. 6A is a perspective view illustrating the relay case according to a second embodiment.
Figure 6B:
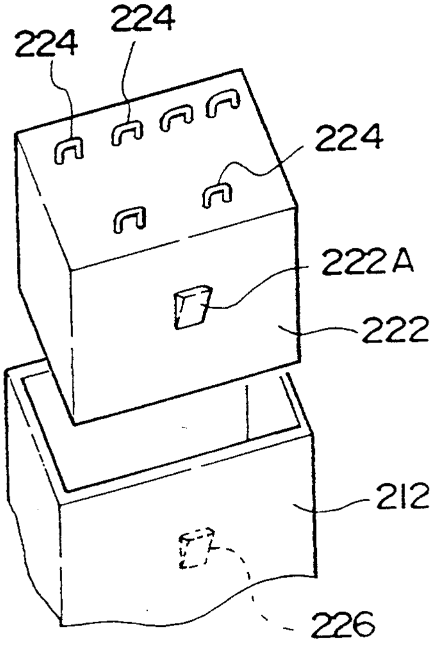
FIG. 6B is a perspective view illustrating the state in which the relay box shown in FIG. 6A is taken out of the casing.

FIGS. 6A and B illustrate a relay case 212 according to a second embodiment of the present invention. The relay case 212 is designed to accommodate a relay box 222 which integrates the relay means 134 (see FIG. 1) to form a unified structure. This relay box 222 has terminals 224 protruding therefrom for connecting wiring lines. Moreover, a claw 222A protruding from the relay box 222 is intended for engaging with a coupling concave part 226 formed on the inner circumferential surface of the relay case 212 thereby preventing the relay box 222 from accidentally coming apart.

Figure 7:
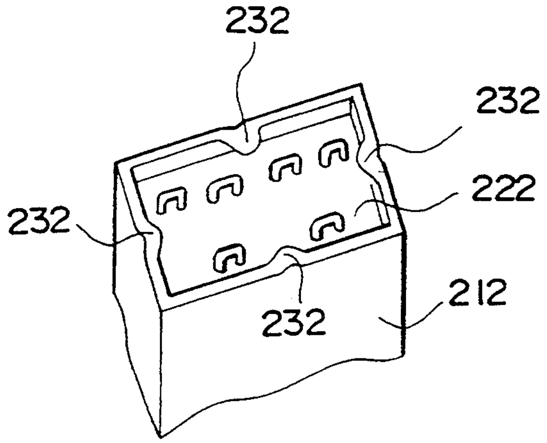
FIG. 7 is a perspective view illustrating the relay case according to a third embodiment.

In a third embodiment of the present invention as shown in FIG. 7, bent portions 232 are formed by thermal caulking in the neighborhood of the opening in the relay case 212 after the relay box 222 has been inserted into the case, the bent portions 232 thereby reduce the inner diameter of the opening of the relay case 212 and thereby preventing the relay case 212 from accidentally coming apart.

Table 1 below shows the motor torque efficiency rate of the window regulating apparatus embodying the present invention as compared with the prior art example.

TABLE 1

| | | Wiring Resistance [Ω] | Efficiency Rate [%] |
|---|---|---|---|
| Prior Art | Driver Seat | 0.18 | 100 |
| | Passenger Seat | 0.33 | 76.5 |
| Present Invention | Driver Seat | 0.18 | 100 |
| | Passenger Seat | 0.18 | 100 |

The efficiency rates cited indicate the values found by comparison of the motor torque (kg f cm). In the prior art wiring, as described above, the driving power supply line leading to the motor is once connected to the master switch installed on the side of the door of the driver and is led out of the master switch and then connected to the motor respectively via the up-down switches provided on the individual doors. Consequently, the wiring resistance as actually measured in the prior art wiring in the door on the passenger seat side is 0.33 Ω as compared with the resistance value 0.18 Ω measured in the wiring in the door on the driver seat side.

The efficiency T as conditioned on the differences between the wiring resistances (i.e. 0.18 Ω vs. 0.33 Ω) is expressed by the following equation:

$$T = 1.625 \cdot \phi \cdot Z \cdot I - T_L \tag{1}$$

I in this equation (1) indicates the value of the locking current, namely, the electric current at the time when the window glass is completely closed and locked in the position. Now, the value I is expressed in the following equation:

$$I = \frac{E - V_L}{R_a + R} \tag{2}$$

In these two equations,

T: Motor torque (kg f cm)
$\phi$: Effective magnetic flux (Mx)
Z: Total number of motor revolutions (revolutions)
I: Locking current (A)
E: Power source voltage (V)
$L_L$: Voltage drop (V)
$R_a$: Motor winding resistance (Ω)
R: Wiring resistance (Ω)
$T_L$: Torque loss (kg f cm)

Here, when it is assumed that relevant factors have specific numerical values, 12 V for E, 0.41 V for $V_L$, 0.43 Ω for $R_a$ and 0.18 Ω for R, then the value of I will be 19 A. Moreover, in case the value of R is 0.33 Ω, the value of I will be 15.25 A. When these values are substituted into the equation (1) on the condition that the effective magnetic flux $\phi$ is $41{,}000 \times 10^{-8}$ Wb/cm², that the total number of winding revolutions Z is 280 turns, and that torque loss $T_L$ is 0.5 kg f cm, then the value of T will be 2.98 kg f cm. Also, the value of T will be 2.28 kg f cm in case the value of R is 0.33 Ω. Thus, a comparison between these two T values indicates that the motor torque efficiency of the prior art wiring in the door on the passenger seat side suffers a decline to 76.5% as determined by $2.28 \div 2.98 \times 100$. However, the present invention eliminates this decline, and, therefore, the present invention as applied to a vehicle can reduce the wiring resistance to a minimum, thereby achieving a reduction of the torque loss, since the apparatus according to the present invention does not result in excessively long wiring. However, the length is different from one motor vehicle to another since the apparatus supplies electric current to the motor directly from the power source mounted in the vehicle by a driving power supply line.

By this, it is possible to obtain the necessary torque, without employing a larger capacity motor, in satisfaction of the vehicle condition that the locking force for the window glass should be 25 kg f/cm or more. Thus, the apparatus according to the present invention attains excellent results, including the feature that the motor can be of a compact size and light in weight, particularly in the case of an apparatus which moves the window glass formed into a unified structure together with the motor, as the one shown in FIG. 4.

What is claimed is:

1. A vehicle window regulating apparatus comprising:

passenger seat side driving means provided in a door on the side of a passenger seat, for moving a window glass of the passenger seat side upward and downward;

passenger seat side power supply line for supplying electric power to said passenger seat side driving means;

remote control means provided on a door on the side of a driver seat for generating a first switching signal for controlling the supply and cut off of electric power to said passenger seat side driving means for upward movement of the window glass of the passenger seat side, and for generating a second switching signal for controlling the supply and cut off of electric power to said passenger seat side driving means for downward movement of the window glass of the passenger seat side;

a switch for switching the state of the supply of electric power to said passenger seat side driving means, said switch comprising a first fixed contact point grounded, a first fixed contact point connected to said power supply line, and a first movable contact point connected to said passenger seat side driving means and operable to move independently in response to said first switching signal, and a second fixed contact point grounded, a second fixed contact point connected to said power supply line, and a second movable contact point connected to said passenger seat side driving means and operable to move independently in response to said second switching signal; and a signal line connecting said remote control means and said switch for supplying said first and second switching signals to said switch;

whereby said switch is switched by said first switching signal to supply electric power to said passenger seat side driving means via said passenger seat side power supply line in order to move the window glass upward in such a manner that said first movable contact point comes into contact with said first fixed contact point connected to said power supply line and to cut off the electric power being supplied to said passenger seat side driving means in order to stop the upward movement of the window glass in such a manner that said first movable contact point comes into contact with said first fixed contact point grounded; and whereby said switch is switched by said second switching signal to supply electric power to said passenger seat side driving means via said passenger seat side power supply line in order to move the window glass downward in such a manner that said second movable contact point comes into contact with said second fixed contact point connected to said power supply line and to cut off the electric power being supplied to said passenger seat side driving means in order to stop the downward movement of the window glass in such a manner that said second movable contact point comes into contact with said second fixed contact point grounded.

2. A vehicle window regulating apparatus according to claim 1, further comprising:

driver seat side driving means provided in the door on the side of the driver seat, for moving a window glass of the driver seat side upward and downward;

a power supply line on the side of the driver seat for supplying electric power to said driver seat side driving means;

driver seat side operation means for supplying electric power to said driver seat side driving means via said driver seat side power supply line and also for cutting off the electric power being fed to said driver seat side driving means; and passenger seat side operation means provided on the door on the side of the passenger seat for generating a third switching signal for for controlling the supply and cut off of electric power to said passenger seat side driving means.

3. A vehicle window regulating apparatus according to claim 2, wherein said passenger seat side power supply line and said driver seat side power supply line are substantially of the same diameter and said signal line is of a diameter smaller than that of said passenger seat side power supply line and that of said driver seat side power supply line.

4. A vehicle window regulating apparatus according to claim 2, wherein said switch further comprises a first relay coil excited and demagnetized by said first switching signal and said third switching signal, so that said first movable contact point is moved by a force generated by magnetic excitation in said first relay coil, and a second relay coil excited and demagnetized by said second switching signal and said third switching signal so that said second movable contact point is moved by a force generated by magnetic excitation in said second relay coil.

5. A vehicle window regulating apparatus according to claim 2, wherein said passenger seat side driving means is installed on a lower end edge of said window glass in said door on the passenger seat side, and said driver seat side driving means is installed on a lower end edge of said window glass in said door on said driver seat side.

6. A vehicle window regulating apparatus according to claim 1, wherein said signal line is made smaller in diameter than that of said passenger seat side power supply line.

7. A vehicle window regulating apparatus according to claim 1, wherein said switch further comprises a first relay coil excited and demagnetized by said first switching signal, so that said first movable contact is moved by a force generated by magnetic excitation in said first relay coil and a second relay coil excited and demagnetized by said second switching signal so that said second movable contact is moved by a force generated by magnetic excitation in said second relay coil.

8. A vehicle window regulating apparatus according to claim 1, wherein said switch is constructed in one unified structure with said passenger seat side driving means.

9. A vehicle window regulating apparatus according to claim 1, wherein said signal line is provided in such a manner as to cross the vehicle in its transverse direction.

10. A vehicle window regulating apparatus according to claim 1, wherein said passenger seat side power supply line extends from a power source in the vehicle to said passenger seat side driving means without passing through the door on the side of the driver seat.

11. A motor vehicle window regulating apparatus comprising;

a passenger seat side motor provided in a door on a passenger seat side for moving up and down a window glass in the door on the side of the passenger seat;

relay contact means provided with a first fixed contact point grounded, a first fixed contact point for upward window glass movement, a first fixed contact point for downward window glass movement, a first movable contact point for upward window glass movement, which is moved so as to come in contact with either one of the first fixed contact point grounded and the first fixed contact point for upward window glass movement, and a first movable contact point for downward window glass movement, which is moved so as to come in contact with either one of the first fixed contact point grounded and the first fixed contact point for downward window glass movement, and installed in the door on the passenger seat side;

a passenger seat side power supply line for forming a connection between one terminal of the passenger seat side motor and the first movable contact point for upward window glass movement, a connection between the other terminal of the passenger seat side motor and the first movable contact point for downward window glass movement, a connection between the first fixed contact point for upward window glass movement and the first fixed contact point for downward window glass movement, and a connection between a power source and any one of the first fixed contact point for upward window glass movement and the first fixed contact point for downward window glass movement;

a relay coil for upward window glass movement, one terminal of which is connected to the passenger seat side power supply line connected to the power source, provided in the door on the passenger seat side to move the first movable contact point for upward window glass movement;

a relay coil for downward window glass movement, one terminal of which is connected to the passenger seat side power supply line connected to the power source, provided in the door on the passenger seat side to move the first movable contact point for downward window glass movement;

a remote control switch installed on the door on the driver seat side, and provided with a second fixed contact point for upward window glass movement, a second fixed contact point for downward window glass movement, and a remote control movable contact point with one terminal grounded, which is selectively brought into contact with either one of the second fixed contact point for upward window glass movement and the second fixed contact point for downward window glass movement; and a signal line having a diameter smaller than that of the passenger seat side power supply line and forming a connection between the other terminal of the relay coil for upward window glass movement and the second fixed contact point for upward window glass movement and between the other terminal of the relay coil for downward window glass movement and the second fixed contact point for downward window glass movement.

12. A motor vehicle window regulating apparatus according to claim 11, further comprising:

a passenger seat side operation switch installed on the door on the side of the passenger seat and provided with a third fixed contact point for upward window glass movement connected to said signal line forming a connection between the other terminal of the relay coil for upward window glass movement and the second fixed contact point for upward window glass movement, a third fixed contact point for downward window glass movement connected to said signal line forming a connection between the other terminal of the relay coil for downward window glass movement and the second fixed contact point for downward window glass movement, and an operation movable contact point with one terminal grounded, which is selectively brought into contact with either one of the third fixed contact point for upward window glass movement and the third fixed contact point for downward window glass movement.

13. A motor vehicle window regulating apparatus according to claim 11, further comprising:

a driver seat side motor installed in the door on the side of the driver seat to move a window glass in the door on the side of the driver seat up and down;

a driver seat side operation switch installed on the door on the side of the driver seat and provided with a second fixed contact point grounded, a third fixed contact point for upward window glass movement, a third fixed contact point for downward window glass movement, a second moveable contact point for upward window glass movement selectively brought into contact with either one of the second fixed contact point grounded and the third fixed contact point for upward window glass movement, and a second movable contact point for downward window glass movement selectively brought into contact with either one of the second fixed contact point grounded and the third fixed contact point for downward window glass movement; and a driver seat side power supply line for forming a connection between one terminal of the motor on the side of the driver seat and the second movable contact point for upward window glass movement, a connection between the other terminal of the motor on the side of the driver seat and the second movable contact point for downward window glass movement, a connection between the second fixed contact point for upward window glass movement and the second fixed contact point for downward window glass movement, and a connection between the power source and any one of the second fixed contact point for upward window glass movement and the second fixed contact point for downward window glass movement, and having a diameter substantially identical to that of the passenger seat side power supply line.

14. A motor vehicle window regulating apparatus according to claim 13, further comprising:

a passenger seat side operation switch installed on the door on the side of the passenger seat and provided with a third fixed contact point for upward window glass movement connected to said signal line forming a connection between the other terminal of the relay coil for upward window glass movement and the second fixed contact point for upward window glass movement, a third fixed contact point for downward window glass movement connected to said signal line forming a connection between the other terminal of the relay coil for downward window glass movement and the second fixed contact point for downward window glass movement, and an operation movable contact point with one terminal grounded, which is selectively brought into contact with either one of the third fixed contact point for upward window glass movement and the third fixed contact point for downward window glass movement.

15. A motor vehicle window regulating apparatus according to claim 13, wherein said passenger seat side motor is installed on the lower end edge of the window glass in the door on the side of the passenger seat and said driver seat side motor is installed on the lower end edge of the window glass in the door on the side of the driver seat.

16. A motor vehicle window regulating apparatus according to claim 11, wherein said relay contact points, said relay coil for upward window glass movement, and said relay coil for downward window glass movement are constructed in one structure unified with said passenger seat side motor.

17. A motor vehicle window regulating apparatus according to claim 11, wherein said signal line is provided in such a manner as to cross the vehicle in its transverse direction.

18. A motor vehicle window regulating apparatus according to claim 11, wherein the passenger seat side window glass is moved according to movement of the passenger seat side motor in the door on the side of the passenger seat.

* * * * *